US012753639B2

(12) United States Patent
Lovasz

(10) Patent No.: US 12,753,639 B2
(45) Date of Patent: Oct. 6, 2026

(54) TOOLBOX MOUNTING DEVICE

(71) Applicant: Essentially Engineered, LLC, Cheyenne, WY (US)

(72) Inventor: Jacob Lovasz, Westminster, CO (US)

(73) Assignee: Essentially Engineered, LLC, Cheyenne, WY (US)

(*) Notice: Subject to any disclaimer, the term of this patent is extended or adjusted under 35 U.S.C. 154(b) by 0 days.

(21) Appl. No.: 19/427,213

(22) Filed: Dec. 19, 2025

(65) Prior Publication Data

US 2026/0115890 A1 Apr. 30, 2026

Related U.S. Application Data

(63) Continuation of application No. 19/316,029, filed on Sep. 2, 2025, now abandoned.

(60) Provisional application No. 63/690,039, filed on Sep. 3, 2024.

(51) Int. Cl.

| | |
|---|---|
| ***E05B 73/00*** | (2006.01) |
| ***A47F 5/08*** | (2006.01) |
| ***B25H 5/00*** | (2006.01) |
| ***F16B 2/12*** | (2006.01) |

(52) U.S. Cl.

CPC ............ *E05B 73/00* (2013.01); *A47F 5/0861* (2013.01); *B25H 5/00* (2013.01); *F16B 2/12* (2013.01)

(58) Field of Classification Search

CPC ...... E05B 17/002; E05B 17/14; E05B 17/142; E05B 73/00; E05B 73/0017; E05B 73/0029; A47B 81/005; A47F 5/0861

See application file for complete search history.

(56) References Cited

U.S. PATENT DOCUMENTS

| | | | | |
|---|---|---|---|---|
| 4,154,072 A * | 5/1979 | Flaschar | E05B 17/183 | 70/455 |
| 5,259,220 A * | 11/1993 | Fredrickson | A47F 5/0861 | 70/52 |
| 5,275,027 A * | 1/1994 | Eklof | A47F 5/0861 | 70/38 A |
| 5,582,044 A * | 12/1996 | Bolich | E05B 73/007 | 224/315 |
| 6,263,709 B1 * | 7/2001 | Kemery | A63C 11/006 | 70/58 |
| 6,619,485 B1 * | 9/2003 | Jenkins | E05B 73/00 | 211/70.6 |

(Continued)

*Primary Examiner* — Christopher J Boswell

(74) *Attorney, Agent, or Firm* — Rogue.law; Laura A Schneider

(57) ABSTRACT

A toolbox mounting device has a rail, a lock arm, and a lock assembly. The lock arm is affixed to the rail and has a flange surface and recess shaped and configured to engage a first surface of a toolbox, the lock arm having a fixed shape. The lock assembly has a locking mechanism, a plunger, and a detent assembly having a detent shaped and configured to engage a second surface of the toolbox. The detent assembly and detent are positioned, shaped, and configured to snap the toolbox to the mounting device when the toolbox is pressed against the lock arm and the detent. The plunger is positioned, shaped, and configured to disengage the detent from the toolbox in response to a pulling action on the plunger. The locking mechanism is positioned, shaped, and configured to selectively prevent the plunger from moving in response to the pulling action.

20 Claims, 7 Drawing Sheets

(56) References Cited

U.S. PATENT DOCUMENTS

| | | | | |
|---|---|---|---|---|
| 6,763,690 | B2 * | 7/2004 | Galant | E05B 73/0082<br>248/553 |
| 10,874,212 | B2 * | 12/2020 | Wood | A47B 81/005 |

* cited by examiner

TOOLBOX MOUNTING DEVICE

TECHNICAL FIELD

Embodiments herein are related to vehicle accessories and specifically to accessories for storage in a vehicle.

BACKGROUND

Trucks, and, more specifically, pickup trucks, are regularly used to move items in the truck bed. Contractors, DIYers, and others often move between job sites and need to transport tools with them, and prefer to do so in an orderly fashion. The industry has responded by providing a variety of mechanisms to store and transport tools.

There remains a need, however, for a means to transport tools that both provides easy access for the owner and deters theft or unintentional movement while the truck is in motion.

SUMMARY

An exemplary toolbox mounting device has a rail, a lock arm, and a lock assembly. The lock arm is affixed to the rail and has a flange surface and recess shaped and configured to engage a first surface of a toolbox, the lock arm having a fixed shape. The lock assembly has a locking mechanism, a plunger, and a detent assembly having a detent shaped and configured to engage a second surface of the toolbox. The detent assembly and detent are positioned, shaped, and configured to snap the toolbox to the mounting device when the toolbox is pressed against the lock arm and the detent. The plunger is positioned, shaped, and configured to disengage the detent from the toolbox in response to a pulling action on the plunger. The locking mechanism is positioned, shaped, and configured to selectively prevent the plunger from moving in response to the pulling action.

An exemplary method includes providing the toolbox mounting device described above, affixing the toolbox mounting device to a surface of a vehicle, providing a key, and providing a toolbox having a first surface and a second surface, and a distance therebetween. The exemplary method includes positioning the first surface of the toolbox adjacent the lock arm, pressing the second surface against the detent to snap the toolbox to the toolbox mounting device, using the key to lock the lock assembly, whereby the toolbox is locked to the toolbox mounting device.

An exemplary toolbox mounting device has a rail, a lock arm, and a lock assembly. The lock arm is affixed to the rail, the lock arm having a flange surface and recess shaped and configured to engage a first surface of a toolbox, the lock arm having a fixed shape. The lock assembly has a detent assembly having a detent with a flange surface shaped and configured to engage a second surface of the toolbox. The detent assembly and detent are positioned, shaped, and configured to snap the toolbox to the mounting device when the toolbox is pressed against the lock arm and the detent. The detent is responsive to a pulling action, whereby the detent is disengagable from the toolbox.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. The claimed subject matter is not limited to implementations that solve any or all disadvantages noted in the Background.

DETAILED DESCRIPTION

Embodiments herein provide a means to transport tools that both provides easy access for the owner and deters theft or unintentional movement while the truck is in motion.

Figure 1:
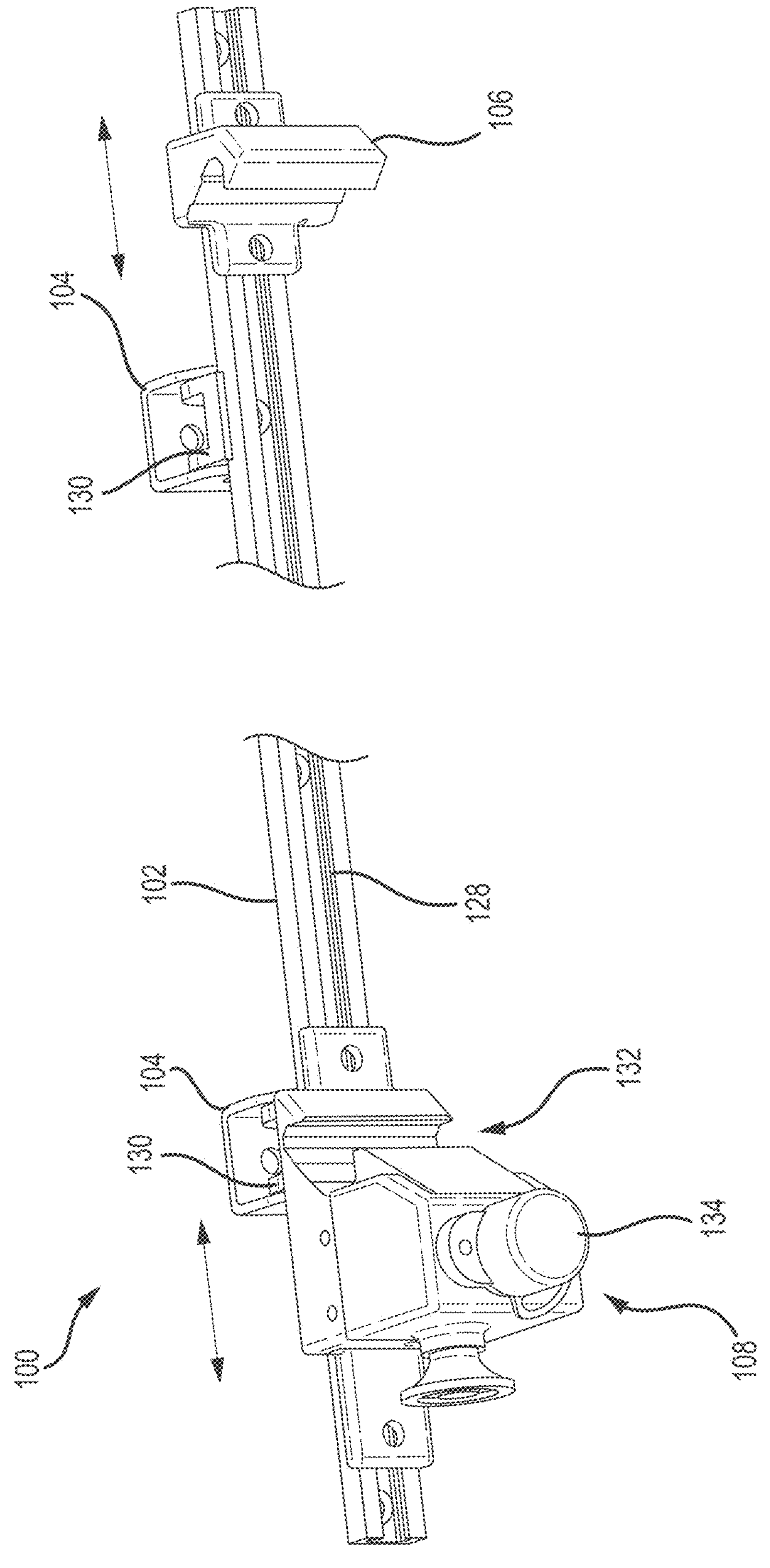
FIG. 1 is a front perspective view of an exemplary toolbox mounting device.

With reference now to FIG. 1, in some embodiments, a toolbox mounting device 100 is provided, which may simply be referenced herein as device 100 for brevity. The device may have a rail 102. The rail 102 may be configured to slidingly receive locking features, which may be a lock arm 106 and/or a lock assembly 108. In some embodiments, a distance between the lock arm 106 and the lock assembly 108 is adjustable.

The device 100 may have at least one mounting fixture 104 shaped and configured to affix the rail to a surface (not shown). The device 100 may have a plurality of mounting fixtures 104 shaped and configured to affix the rail 102 to a surface.

Figure 2:
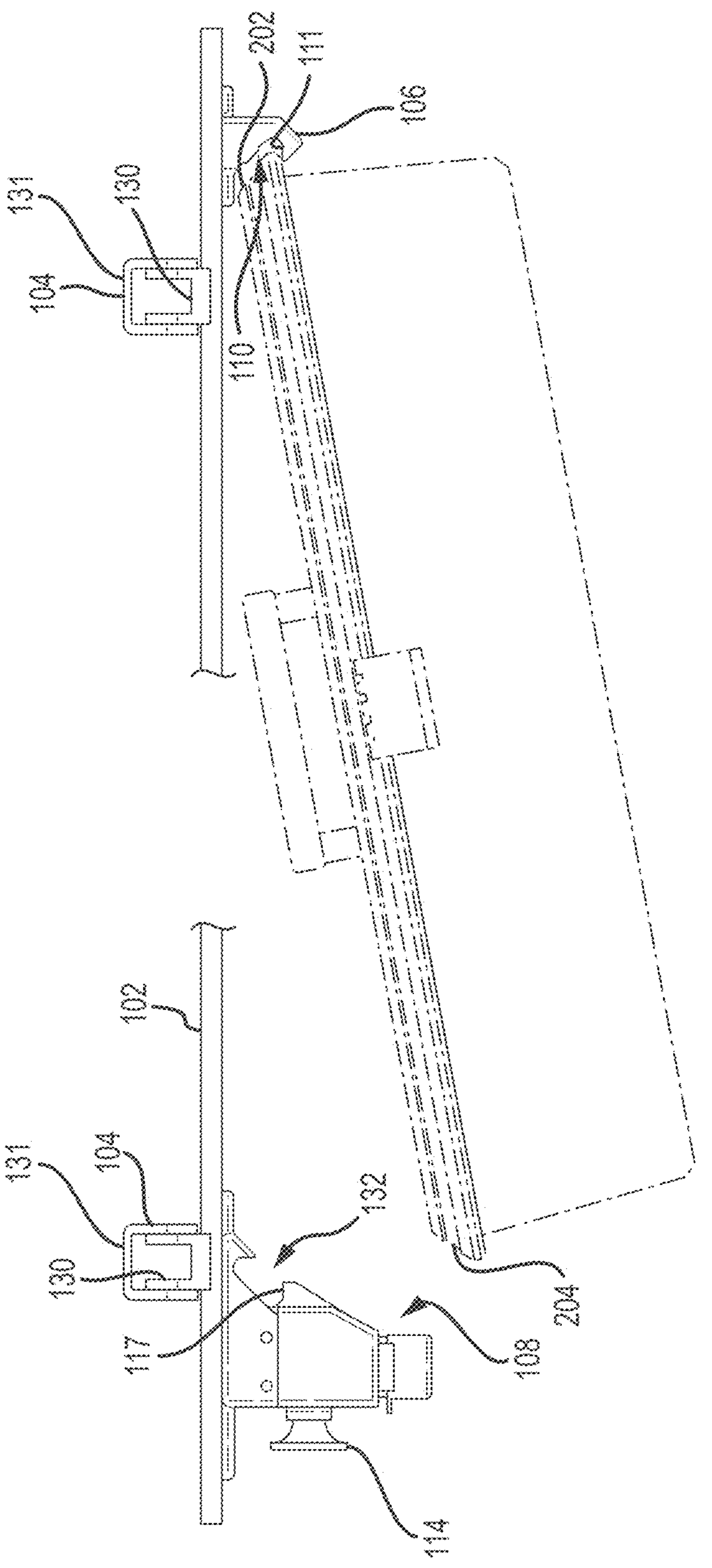
FIG. 2 is a top view of the device and a toolbox in the process of being mounted to the device.
Figure 3:
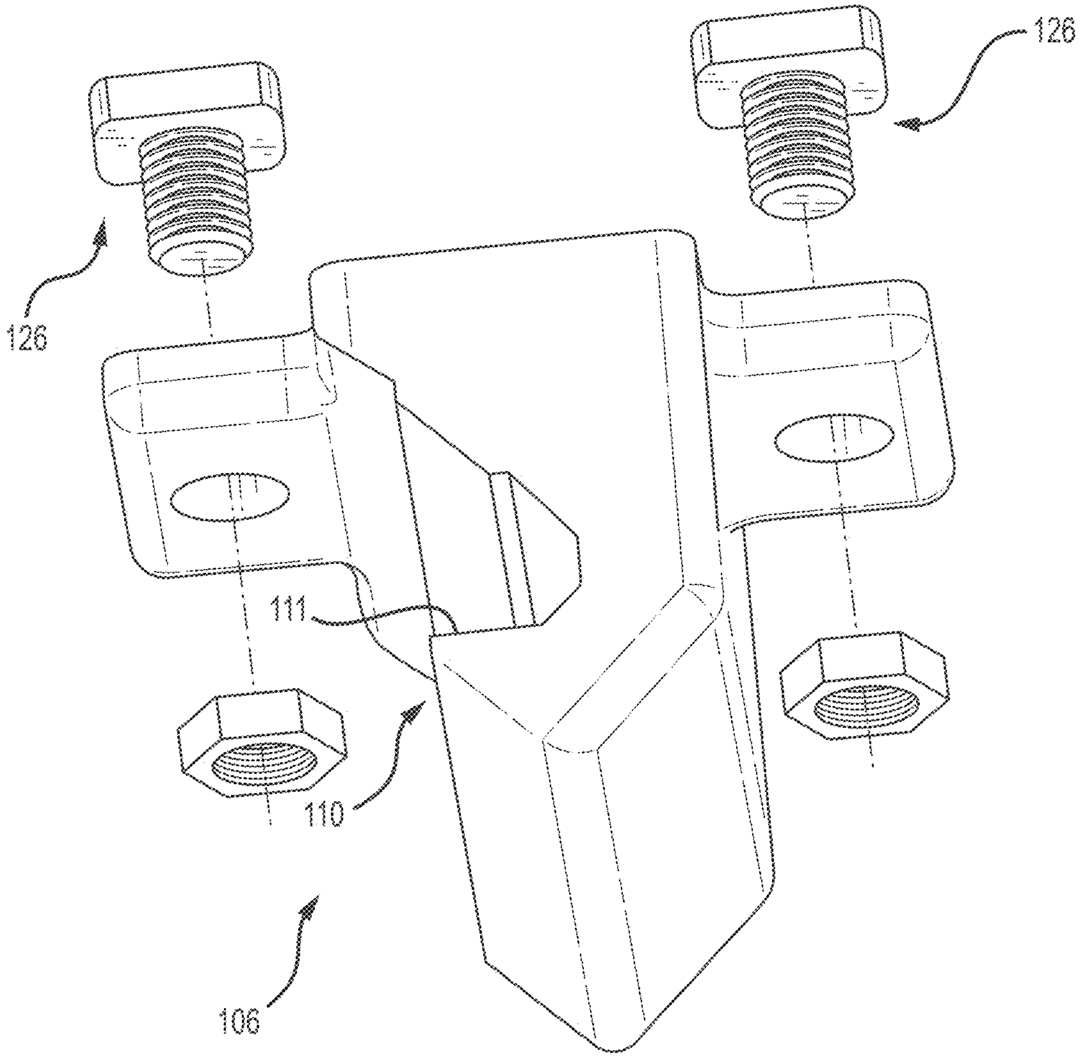
FIG. 3 is a perspective view of a lock arm and fasteners suitable for use in the device of FIG. 1.

Turning now to FIG. 2 and FIG. 3, in some embodiments, the device 100 may have a lock arm 106 affixed to the rail 102. The lock arm 106 may have a flange surface 111 and\or recess 110 shaped and configured to engage a first surface of a toolbox 200. The lock arm 106 may have a fixed shape; that is, the lock arm 106 may be a unitary piece, and/or the lock arm 106 may have a substantially rigid shape. The lock arm 106 may be slidable between a first position on the rail 102 and a second position on the rail 102. The device 100 may have a fastener 126 for affixing the lock arm 106 to the rail 102.

Figure 4:
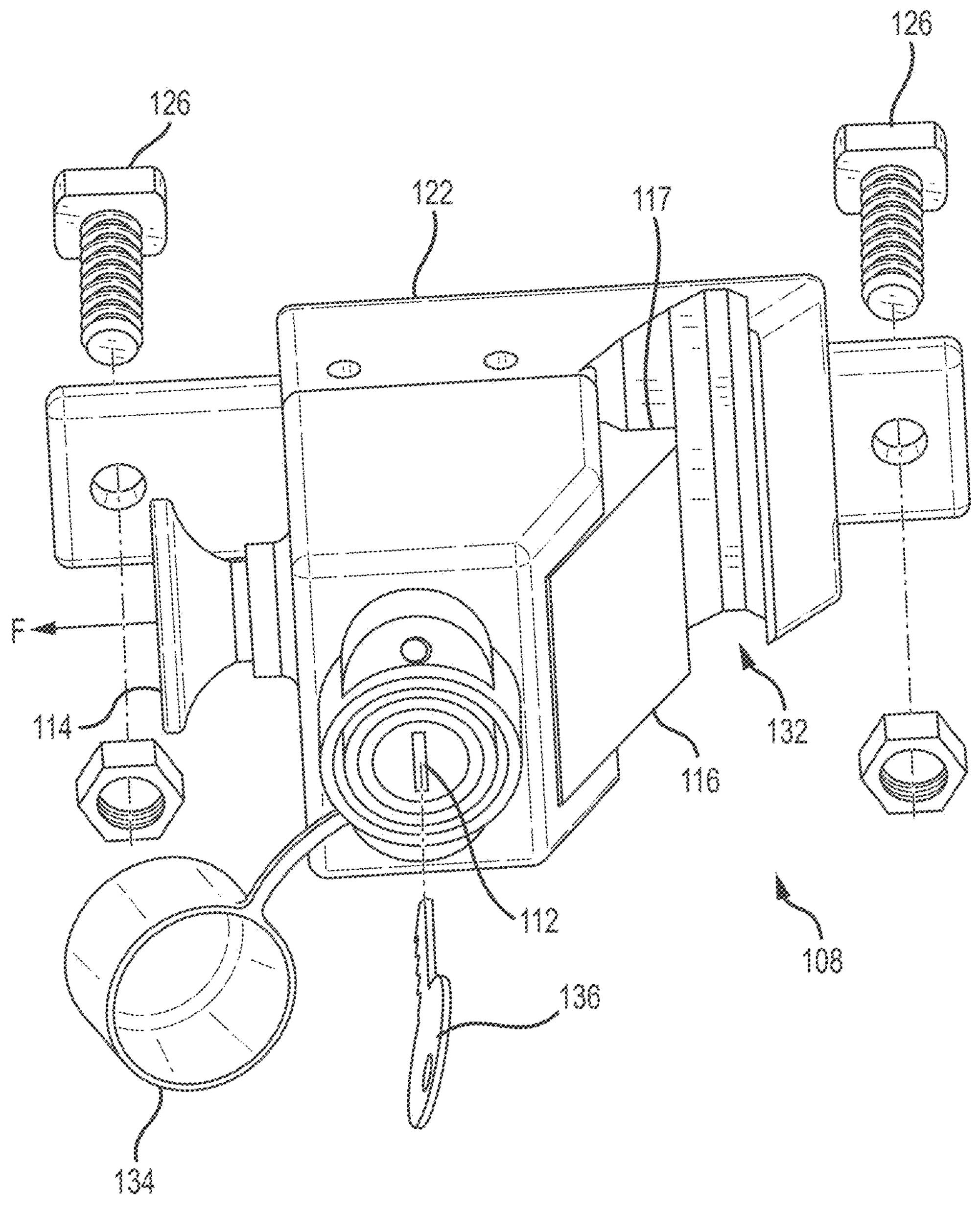
FIG. 4 is a perspective view of a lock assembly and fasteners suitable for use in the device of FIG. 1.

With reference now to FIG. 2 and FIG. 4, in some embodiments, the device 100 may have a lock assembly 108. The lock assembly 108 may have a locking mechanism 112, a plunger 114, and a detent assembly 118. The detent assembly 118 may have a detent 116 shaped and configured to engage a second surface of the toolbox 200. The detent assembly 118 and detent 116 may be positioned, shaped, and configured to snap the toolbox 200 to the mounting device 100 when the toolbox is pressed against the lock arm 106 and the detent 116.

Figure 5:
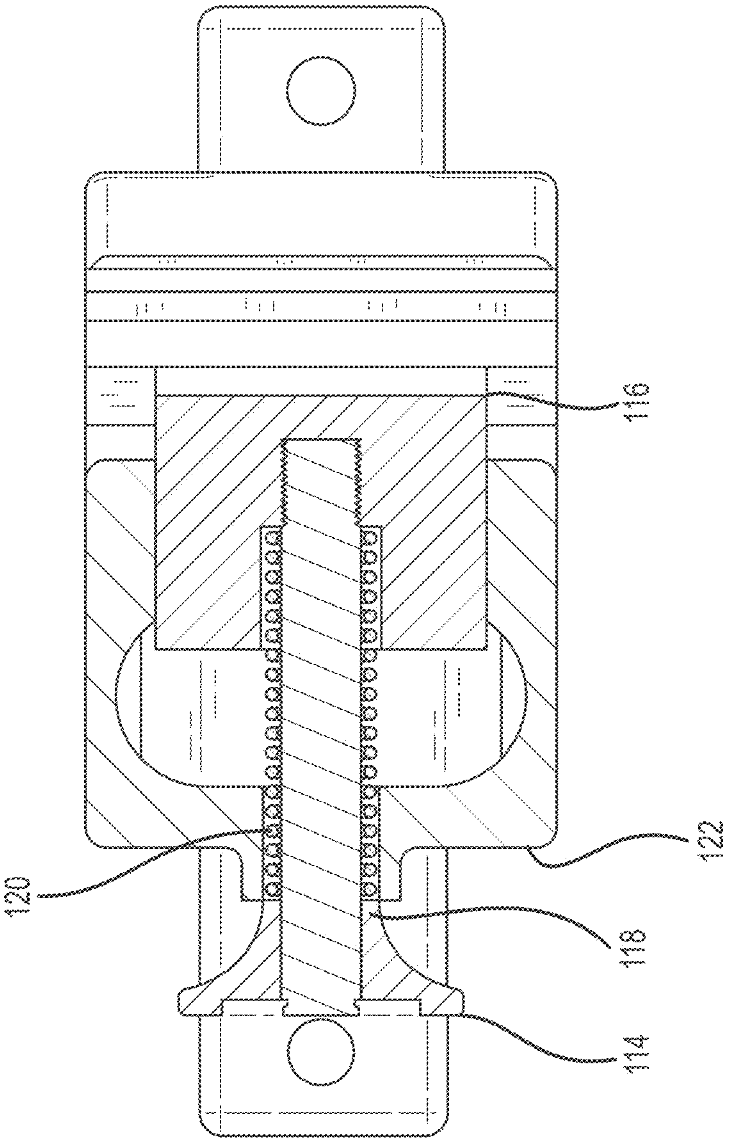
FIG. 5 is a first section view illustrating some features of the lock assembly.

With brief referent to FIG. 5, the detent assembly 118 may include a detent 116, a spring 120, and a plunger 114, and may be configured to move the detent 116 relative to a housing 122 of the lock assembly 108. The detent 116 may have a flange surface 117 (see also FIG. 4) to engage the toolbox 200. Flange surfaces 117, 111 may be positioned to selectively prevent the toolbox 200 from being removed from the device 100. A pulling action or force F on the plunger 114 may cause the flange surface 117 to disengage from the toolbox 200, whereby the toolbox 200 can be removed from the device 100.

Returning to FIG. 1 and FIG. 4, the lock assembly 108 may be slidable between a first position on the rail and a second position on the rail. The device may have a fastener 126 for affixing the lock assembly 108 to the rail 102.

The locking mechanism 112 may be positioned, shaped, and configured to selectively prevent the plunger 114 from moving in response to the pulling action F. The locking mechanism 112 may be configured to selectively prevent the detent assembly 118 from disengaging from the toolbox 200.

The fasteners 126 may allow for selectively affixing the lock arm 106 and lock assembly 108 to the rail 102, whereby a distance between the lock arm 106 and the lock assembly 108 is adjustable. The fasteners for selectively affixing the lock arm 106 and lock assembly 108 may comprise T-bolts and nuts. The rail 102 may have a channel 128 shaped and configured to engage the fasteners 126, such as by engaging heads of the T-bolts.

In some embodiments, the mounting fixture 104 includes a plurality of mounting fixtures 104. The plurality of mounting fixtures 104 may include a first plurality of brackets 130 affixed to the rail 102 and a second plurality of brackets 131 for affixing the device 100 to a surface (not illustrated). Location(s) of the mounting fixture(s) 104 on the rail 102 may be adjustable, such as by using fasteners that pass through the rail 102. However, those skilled in the art will recognize that at least a portion the mounting fixture(s) 104 may be permanently affixed to the rail 102.

With reference to FIG. 4, in some embodiments, the device 100 has a detachable weather protection cap for protecting the locking mechanism 112 from weather elements.

Figure 6:
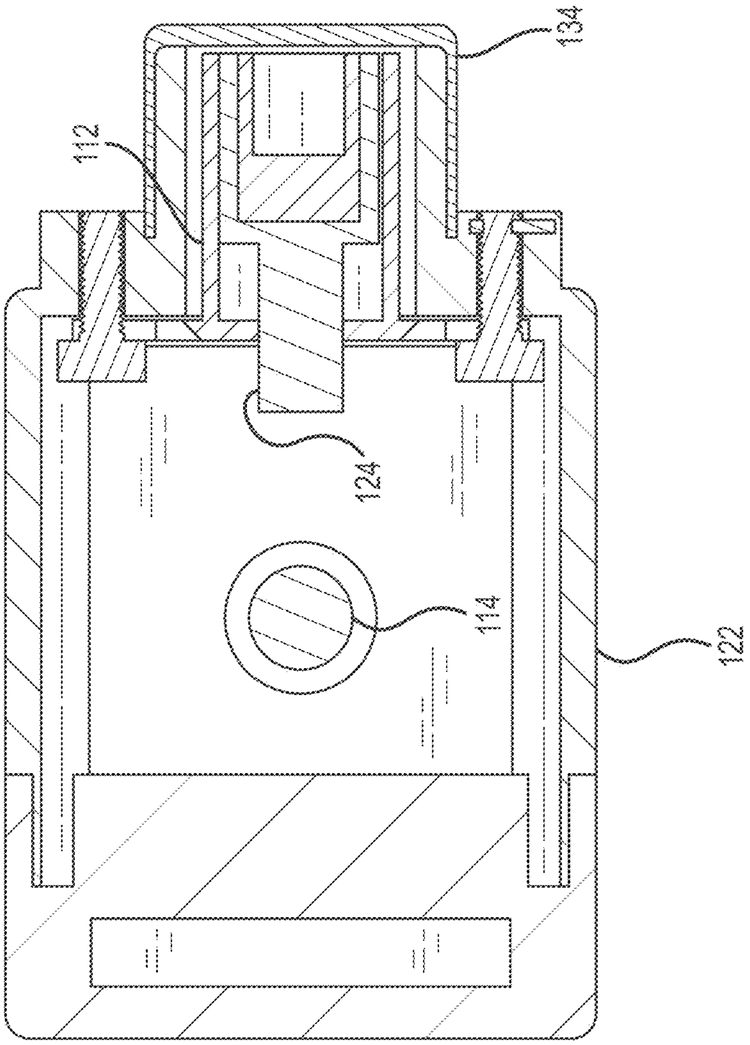
FIG. 6 is a second section view illustrating some features of the lock assembly.

Continuing with FIG. 4 and FIG. 6, embodiments of the locking mechanism 112 are described in more detail. The locking mechanism 112 may be a key lock mechanism as shown, and known to those skilled in the art. The locking mechanism 112 may have a key 136 configured to operate a tailpiece 124 to selectively engage the plunger 114 using means known to those skilled in the art. Those skilled in the art, however, will recognize the locking mechanism 112 may be any locking mechanism suitable to prevent the detent 116 from disengaging. The locking mechanism 112 may be, without limitation, a keyed cylinder lock, a keyed or combination padlock, or a keyed or combination deadbolt.

Figure 7:
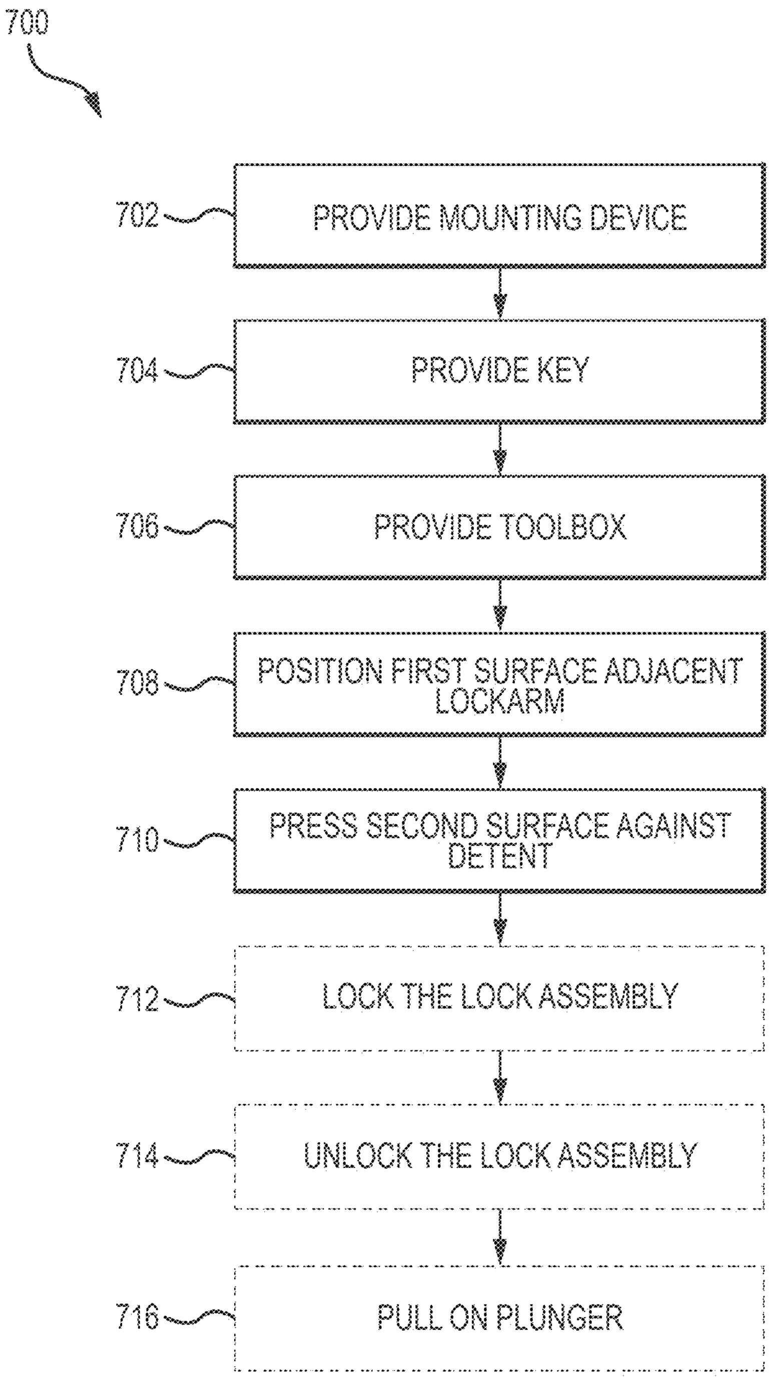
FIG. 7 is a flowchart of an exemplary method.

Turning now to FIG. 7, embodiments of a method 700 are described. The method 700 may include providing 702 a toolbox mounting device 100 as described herein and affixing the device 100 to a surface of a motorized or non-motorized vehicle. The vehicle may be, without limitation, a pickup truck, a van, a cargo truck, or a trailer intended to be pulled by a motorized vehicle. The method 700 may include providing 704 a key 704. The method may include providing 706 a toolbox having a first surface and a second surface, and a distance therebetween, positioning 708 the first surface of the toolbox adjacent the lock arm, and pressing 710 the second surface against the detent to snap the toolbox to the toolbox mounting device. The method may include using the key to lock the lock assembly 712, whereby the toolbox is locked to the toolbox mounting device.

The method 700 may include using the key to unlock the lock assembly 714. The method 700 may include pulling 716 on the plunger, whereby the toolbox is detachable from the toolbox mounting device.

The method 700 may include moving the lock arm from a first position on the rail to a second position on the rail to adjust a distance between the lock arm and the lock assembly and/or affixing the lock arm to the rail. The method 700 may include moving the lock assembly from a first position on the rail to a second position on the rail to adjust a distance between the lock arm and the lock assembly and/or adjusting a distance between the lock arm and the lock assembly. The method 700 may include adjusting a mounting location for the toolbox.

Each of the various elements disclosed herein may be achieved in a variety of manners. This disclosure should be understood to encompass each such variation, be it a variation of an embodiment of any apparatus embodiment, a method or process embodiment, or even merely a variation of any element of these. Particularly, it should be understood that the words for each element may be expressed by equivalent apparatus terms or method terms-even if only the function or result is the same. Such equivalent, broader, or even more generic terms should be considered to be encompassed in the description of each element or action. Such terms can be substituted where desired to make explicit the implicitly broad coverage to which this invention is entitled.

As but one example, it should be understood that all action may be expressed as a means for taking that action or as an element which causes that action. Similarly, each physical element disclosed should be understood to encompass a disclosure of the action which that physical element facilitates. Regarding this last aspect, the disclosure of a "attachment mechanism" should be understood to encompass disclosure of the act of "attaching"-whether explicitly discussed or not-and, conversely, were there only disclosure of the act of "attaching", such a disclosure should be understood to encompass disclosure of a "attaching mechanism". Such changes and alternative terms are to be understood to be explicitly included in the description.

Moreover, the claims shall be construed such that a claim that recites "at least one of A, B, or C" shall read on a device that requires "A" only. The claim shall also read on a device that requires "B" only. The claim shall also read on a device that requires "C" only. The claim shall also read on a device that requires "A+B". The claim shall also read on a device that requires "A+B+C", and so forth.

Those skilled in the art can readily recognize that numerous variations and substitutions may be made in the invention, its use and its configuration to achieve substantially the same results as achieved by the embodiments described herein.

Accordingly, there is no intention to limit the invention to the disclosed exemplary forms. Many variations, modifications and alternative constructions fall within the scope and spirit of the invention as expressed in the claims.

The invention claimed is:

1. A toolbox mounting device, comprising:

a rail;

a lock arm affixed to the rail, the lock arm having a flange surface and recess shaped and configured to engage a first surface of a toolbox, the lock arm having a fixed shape; and a lock assembly having a locking mechanism, a plunger, and a detent assembly having a spring-biased detent shaped and configured to engage a second surface of the toolbox;

wherein:

the detent assembly is positioned, shaped, and configured to snap the toolbox to the mounting device when the toolbox is translated toward the rail and pressed against the lock arm and the detent;

the plunger is positioned, shaped, and configured to disengage the detent from the toolbox in response to a pulling action on the plunger; and the locking mechanism is positioned, shaped, and configured to selectively prevent the plunger from moving in response to the pulling action.

2. The toolbox mounting device of claim 1, further comprising:

at least one fixture shaped and configured to affix the rail to a surface.

3. The toolbox mounting device of claim 1, wherein:

the lock arm is slidable between a first position on the rail and a second position on the rail.

4. The toolbox mounting device of claim 3, further comprising:

a fastener for affixing the lock arm to the rail.

5. The toolbox mounting device of claim 1, wherein:

the lock assembly is slidable between a first position on the rail and a second position on the rail.

6. The toolbox mounting device of claim 5, further comprising:

a fastener for affixing the lock assembly to the rail.

7. The toolbox mounting device of claim 1, wherein:

a distance between the lock arm and the lock assembly is adjustable.

8. The toolbox mounting device of claim 1, further comprising:

a fastener for selectively affixing the lock arm to the rail; and a fastener for selectively affixing the lock assembly to the rail; wherein a distance between the lock arm and the lock assembly is adjustable.

9. The toolbox mounting device of claim 8, wherein:

the fasteners for selectively affixing the lock arm and lock assembly comprise T-bolts and nuts; and the rail comprises a channel shaped and configured to engage heads of the T-bolts.

10. The toolbox mounting device of claim 1, further comprising:

a plurality of mounting fixtures, the plurality of mounting fixtures having a first plurality of brackets affixed to the rail and a second plurality of brackets for affixing the device to the surface.

11. The toolbox mounting device of claim 1, further comprising:

a detachable weather protection cap for protecting the locking mechanism from weather elements.

12. The toolbox mounting device of claim 1, further comprising:

a key for locking and unlocking the lock assembly.

13. A method, comprising:

providing the toolbox mounting device of claim 1;

affixing the toolbox mounting device to a surface of a vehicle;

providing a key;

providing a toolbox having a first surface and a second surface, and a distance therebetween;

positioning the first surface of the toolbox adjacent the lock arm;

translating the toolbox toward the mounting device and pressing the second surface against the detent to snap the toolbox to the toolbox mounting device; and using the key to lock the lock assembly, whereby the toolbox is locked to the toolbox mounting device.

14. The method of claim 13, further comprising:

using the key to unlock the lock assembly; and pulling on the plunger, whereby the toolbox is detachable from the toolbox mounting device.

15. The method of claim 13, further comprising:

moving the lock arm from a first position on the rail to a second position on the rail to adjust a distance between the lock arm and the lock assembly.

16. The method of claim 13, further comprising:

affixing the lock arm to the rail.

17. The method of claim 13, further comprising:

moving the lock assembly from a first position on the rail to a second position on the rail to adjust a distance between the lock arm and the lock assembly.

18. The method of claim 13, further comprising:

adjusting a distance between the lock arm and the lock assembly.

19. The method of claim 13, further comprising:

adjusting a mounting location for the toolbox.

20. A toolbox mounting device, comprising:

a rail;

a lock arm affixed to the rail, the lock arm having a flange surface and recess shaped and configured to engage a first surface of a toolbox, the lock arm having a fixed shape; and a lock assembly having a detent assembly having a spring-biased detent with a flange surface shaped and configured to engage a second surface of the toolbox; wherein:

the detent assembly and detent are positioned, shaped, and configured to snap the toolbox to the mounting device when the toolbox is translated toward the rail and pressed against the lock arm and the detent; and the detent is responsive to a pulling action, whereby the detent is disengagable from the toolbox.

* * * * *